Feb. 24, 1925.
J. H. DAMON
SPINDLE
Filed Oct. 18, 1921
1,527,539
2 Sheets-Sheet 2
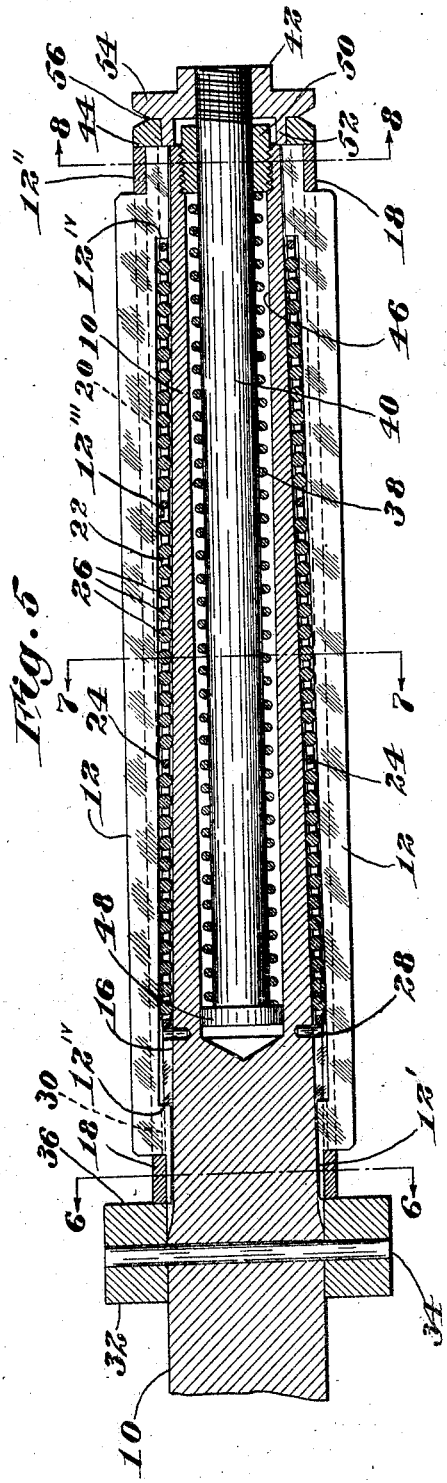
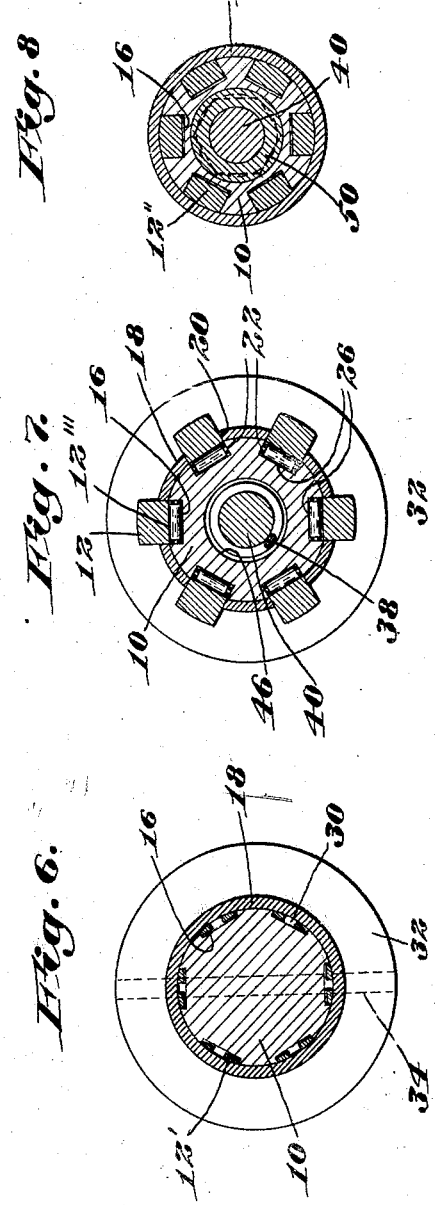
Inventor
John H. Damon,
by Mitchell, Chadwick & Kent,
Attorneys Patented Feb. 24, 1925.                                          1,527,539

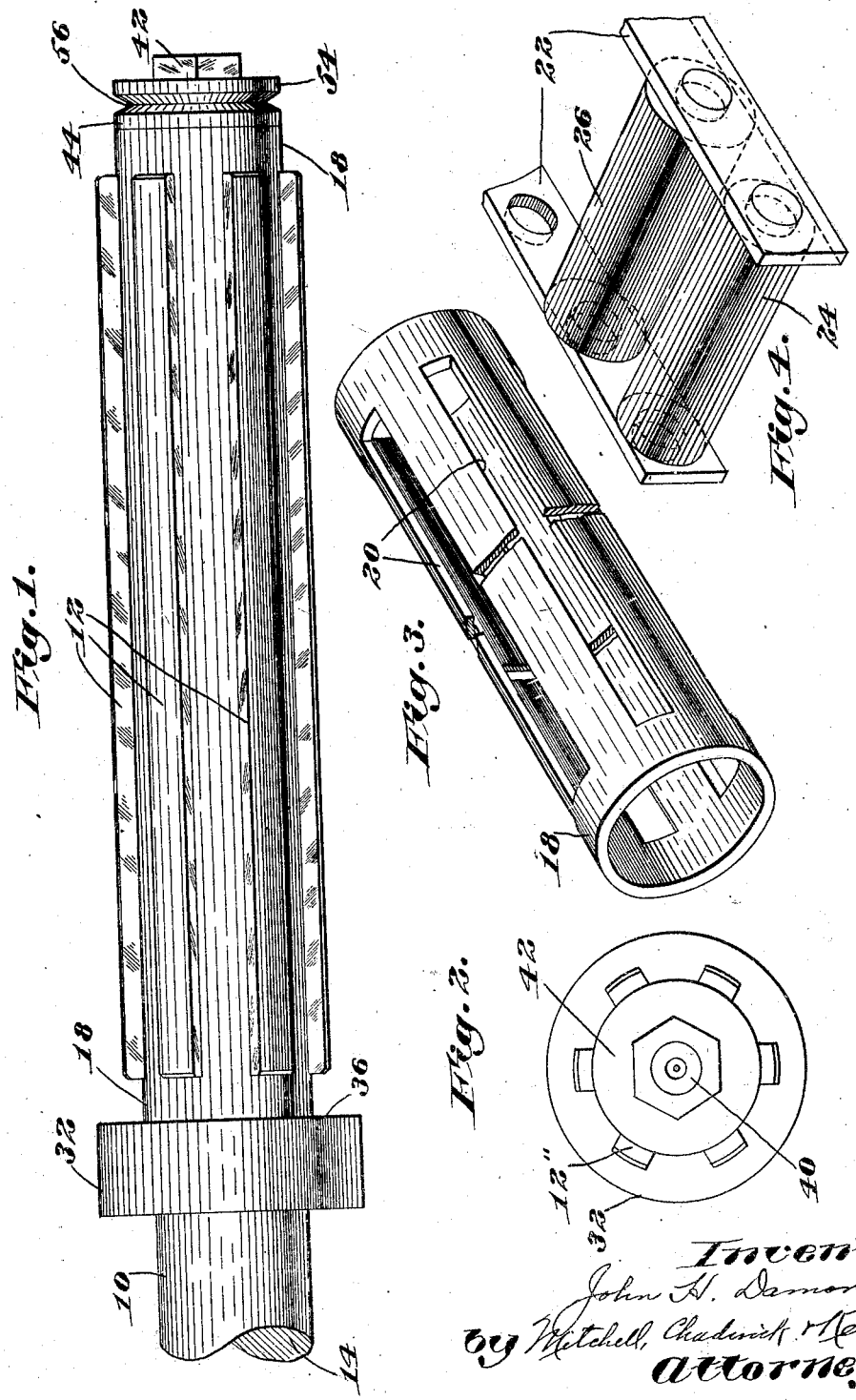

UNITED STATES PATENT OFFICE.

JOHN H. DAMON, OF PLYMOUTH, MASSACHUSETTS, ASSIGNOR TO PLYMOUTH CORDAGE COMPANY, OF PLYMOUTH, MASSACHUSETTS, A CORPORATION OF MASSACHUSETTS.

SPINDLE.

Application filed October 18, 1921. Serial No. 508,511.

*To all whom it may concern:*

Be it known that I, JOHN H. DAMON, a citizen of the United States, residing at Plymouth, in the county of Plymouth and State of Massachusetts, have invented certain new and useful Improvements in Spindles, of which the following is a specification.

This invention relates to improvements in spindles. More particularly it relates to collapsible spindles, arranged to hold work of any sort and adapted to collapse for the removal of the work. The particular form herein described, as an illustration, is especially adapted for the winding of binder twine into cylindrical masses or packages. In such work the necessary high tension produces such a tight constriction of twine upon the spindle that the removal of the package from the spindle presents a problem of difficulty. The elasticity of the material is such that a simple tapered spindle will not serve, because the taper has to be so great as to make too much departure from the desired cylindrical form. It has been proposed to collapse the spindle by providing parallel surfaced bars which can slide longitudinally in tapered grooves; but the constrictive pressure is transmitted through the bars; and such great friction is found between the slidable bars and their internal supports that difficulty in removing the package from the spindle continues.

It is an object of the present invention to provide a spindle which may be of uniform diameter from end to end, however long the spindle may be, holding the article securely; to provide for easy and frictionless removal of the thing maintained upon the spindle, by a collapse of the spindle, when the operator moves the thing in a direction to take it off from the spindle; and to provide for the automatic and immediate resetting of the parts in operative spindle form, upon their release by the removal of the article.

These objects are accomplished by providing movable bars extending along the spindle, on which bars the work is carried, which bars are mounted on anti-friction devices so as to be capable of moving lengthwise of the spindle on a slight taper, but which are constantly pressed in the opposite direction by an interior spring coiled about the axis. The exteriors of the bars are parallel, thus producing the desired cylindrical form. When a package has been wound tightly on such a spindle the friction of the bars would be immovable were it not for the anti-friction devices. And, on the other hand, in the presence of those devices the bars would not stay in place during the winding, were it not for another feature of the invention, the special means which restrains them. The constrictive pressure of the work, acting radially, may be resolved at each bar into two components, one perpendicular to the taper on which the bar is supported and the other parallel to it. The former is so excessive that in tapered bar spindles heretofore constructed it holds the bars fast. An anti-friction bearing may so greatly reduce the friction that the component action parallel to the support may be sufficient to move the bar along the taper. In the preferred form of the invention this is the case; and separate means is provided to prevent such motion of the bars until the operator is ready. These means may be either rigid or yielding. The latter is illustrated, comprising an axial coiled spring of sufficient strength to overcome the component of the constrictive force which is resolved along the surface of the taper. In operation, therefore, the only effort required of the operator is that necessary to overcome such part of the axial spring pressure as is unbalanced. With a suitable pull by the operator on the work the bars slip along the taper until they are so much collapsed that the friction between them and the work ceases. Thereupon the work is free in the operator's hands; and the bars are automatically reset by the axial spring, because the constrictive pressure of the work which urged them along the taper no longer exists, until the next package is wound. There are other incidental features of the invention, as for example, for holding the end of twine when the winding of a fresh package is begun, by causing it to be pinched by the axial spring. It is intended that the patent shall cover, by suitable expression in the appended claims, whatever features of patentable novelty exist in the invention disclosed.

In the drawings:

Figure 1 is a side view of a spindle embodying the invention;

Figure 2 is an end view of the same;

Figure 3 is a perspective of a detail, the bar cage;

Figure 4 is a perspective, greatly enlarged, of a portion of another detail, the roller bearing;

Figure 5 is a medial longitudinal section of Figure 1; and,

Figures 6, 7 and 8 are sections on lines 6—6, 7—7 and 8—8 respectively of Figure 5.

The drawings represent the invention as it has been embodied in a machine for winding binder twine. In its application to this use, which is typical of others, the spindle shaft 10 is equipped with bars 12 which lie along the shaft, with their outer faces projecting radially therefrom, and constituting the working or winding surface of the spindle. The spindle as a whole, therefore, has a fluted surface, preferably cylindrical, on which twine, for example, may be wound, or upon which a piece of work such as a pulley or gear may be mounted. When used for winding twine, or when desired, the spindle has a shank 14 by which it is rotated. The bars 12 are so mounted in tapering grooves 16 cut lengthwise on the shaft that they can be moved in unison endwise along and inward toward the axis; and will automatically return when released. They are held in proper assembly by a cage 18, comprising a cylindrical shell having slots 20 through which the thickness of the bars projects. The cage participates in their longitudinal movement; but their radial movement is in and out through the said slots 20 of the cage, this movement being limited by end parts 12′, 12″ of the bars which extend under unslotted portions of said shell. The axial movements of the bars and cage are simultaneous, because the slots 20 are approximately equal in length to the body portions 12 of the bars which project outward through these slots. Thus longitudinal movement of any bar in either direction draws the cage and other bars with it. The radial movements of the bars are simultaneous and symmetrical because the radial position is determined, for each bar, by the tapered bottom of the groove 16 and by its longitudinal position thereon: and because those grooves are uniform and symmetrical. The bars rotate with the shaft 10 because they have end feet 12′, 12″ which engage in the said grooves 16. The body parts of the bars are not necessarily in the grooves; but they are supported on frictionless bearings, which run therein, and which in the present instance comprise rollers. As herein illustrated each consists of a pair of retaining strips 22, fastened together at intervals by crosspins 24 making a frame whose side strips journal a series of small rollers 26 which cross between them; the whole having a length a little less than the inner surface 12‴ of the middle portion of the bar 12 and the groove bottom which they serve. The end feet 12′, 12″ of the bar 12 extend nearer to the axis than does the body portion of the bar, which is supported on the said rollers, but not near enough to bear on the bottom of the groove 16. Hence there is no friction whatever of the feet on the bottom of the grooves. But this inward extension of feet 12′ 12″ provides radial shoulders 12$^{IV}$ on the bars, between the feet and the body part, at the inner shank and head ends of the inner surface of the body portion of each, against which shoulders the extremities of the strips 22 may abut so that the roller bearings are thus retained in the grooves. When positioned as in Figure 5, the bar can roll toward the head end of the spindle on the rollers, the latter rolling on the bottom of the groove 16, until the shoulder 12$^{IV}$ at the shank end of the bar hits the end of the roller frame. It is desirable that the roller strips be short enough to prevent this limit being reached in practice, and that they be as far toward the head end as possible when the movement of the bars toward that end begins. This latter is provided for by fixing a pin 28 in each groove, which limits shankward movement of the roller frame, the position of this pin being such that when the bar is in its extreme location toward the spindle shank and ready to move headward, the roller strips will be in contact with the radial shoulder 12$^{IV}$ at the head end of the inner surface of the bar. To enable the bars to slide past these pins 28, a groove 30 is cut in the bottom of each of the terminal feet 12′ which enables the bar feet to move freely by the pins without striking them.

The collapsing action of the bars is provided for by cutting the grooves 16 in the shaft 10 on a taper inward toward the head end of the spindle, so that as the bar moves headward on the rollers the latter move inward toward the axis as they roll along the bottoms of the grooves, in consequence of which the bars themselves are free to move radially inward. This inward movement of the bars is uniform radially throughout their entire length, because the inner surface of a bar is at an incline with respect to the outer surface, said incline corresponding with and being parallel to the taper of a groove 16. Thus the inner surface of each bar remains parallel to the groove bottom, and the outer surface remains parallel to the axis but gradually approaches the axis, as the bar moves headward.

At the shallow ends of the grooves near the shank is a collar 32 secured on the shaft, as by a taper pin 34, so as to form the shoulder or stop 36 at a desired distance from the head end for the proper positioning of the cage 18, preferably with its outer end flush with the end of the shaft. Against this shoulder 36 the shank ends of the bars and the corresponding edge of the cage, which, incidentally is illustrated as equal to the overall length of the bars, abut when the latter are in their extreme position toward the shank. They are thus held by a pressure shankward on their head ends produced by a compression spring 38 acting through a rod 40, nut or thrust plate 42 and washer 44. The spring 38 is wound about the central rod 40 which is housed within a hole 46 bored along the axis of the main shaft 10 from its head end. The inner end 48 of this rod is flanged to form a shoulder against which the inner end of the spring presses and to provide a sliding fit with the wall of the hole 46 which coacts with a tubular plug 50 at the outer end to keep the rod in axial alignment thereby effecting a substantially even distribution of pressure on the head end of the bar cage. The outer end of the spring seats against the tubular plug, 50, which is securely threaded in the mouth of the shaft bore 46. Through the hollow of this plug the rod 40 projects and its outside portion carries the thrust plate 42. This plate has a sleeve 52 on its inward or pressing face within whose cavity the end of the plug 50 is housed, and upon whose surface the washer 44 loosely rides. Through this washer, pressed by a flange 54 on the plate, the thrust plate presses shankward on the end of the cage 18 and, as illustrated, on the projections 12″ of the bar feet. Under the influence of the spring 38, the thrust plate 42 thus forces the cage and bars against the shoulder 36 of the collar 32. As shown in Figure 5 the end of the sleeve 52 is also pressing against the bar end, but this is not necessary since it is an incidental feature of the invention that the flange 54 may be slightly separated from the side of the washer 44, to permit the insertion therebetween of the end of the twine which is to be wound on the spindle. To enable the operator to make this insertion easily, the washer 44 and the flange 54 are both beveled to form a V-shaped annular slot 56 between them, so that in starting a new package of twine, the operator can slip the end portion of the twine down into this V slot, thus pushing the thrust plate 42 out a little, to permit the twine to enter between the plate and the washer and so to be secured there under the pressure exerted by the spring 38.

In operation the end of twine that is to be wound may be fastened to the spindle by engaging it in the V throat 56, where the spring 38 pinches it while also pressing the cage 18 and bars 12 to expanded and workholding position. When the package is to be removed the operator simply and easily pulls it off endwise from the spindle. The bars 12 move with the package until sufficiently collapsed and incidentally the engaged end of twine is released. As soon as the package is free the spring restores the bars 12 to their former position.

The particular form of spindle described is self-contained, in the sense that the collapsing mechanism needs no bearing or exterior lock at either end. If the use to which it is desired to apply the invention makes it advisable the spindle may therefore be held at only one end, as herein illustrated by the shank 14. With its power of expanding to work-holding position and contracting for work releasing as illustrated, it may be long or short; and in the latter case as a chuck.

It is not essential that the component of the constructive force of the work applied to the spindle, resolved along the taper, shall exceed the friction of the parts which are to slide along the taper, as herein described, although that is preferable; and it is not essential that the restraining means be yielding, as a spring. For some purposes it may be preferable to have a rigid fastening, such as that of a screw nut, to prevent movement of the cage 18 with respect to the axis until such time as the operator releases the same by backing such a screw nut. And variations in other respects may be made without departing from the scope of the invention as set forth in the appended claims.

I claim as my invention:

1. A collapsible spindle comprising, in combination, a shaft and work holding members on it and distributed around it; there being a substantially frictionless tapered bearing extending along the surface of the said shaft for lengthwise motion of said members on the shaft; and means to prevent and to permit said motion.

2. A collapsible spindle comprising, in combination, a shaft and work holding members on it and distributed around it; there being a substantially frictionless tapered bearing extending along the surface of the said shaft for lengthwise motion of said members on the shaft; and means to restrain yieldingly said motion.

3. A collapsible spindle comprising, in combination, a shaft and work holding members on it and distributed around it; there being a substantially frictionless tapered bearing extending along the surface of the said shaft for lengthwise motion of said members on the shaft; the whole being in such relation that in the normal working position of said members the application of a constrictive force thereto produces an unbalanced tendency of said members to move along the taper; and means to restrain and to permit said motion.

4. A collapsible spindle comprising, in combination, a shaft and work holding members on it and distributed around it; there being a substantially frictionless tapered bearing extending along the surface of the said shaft for lengthwise motion of said members on the shaft; the whole being in such relation that in the normal working position of said members the application of a constrictive force thereto produces an unbalanced tendency of said members to move along the taper; and a spring opposing said motion, of slightly more than sufficient strength to prevent it, whereby with slight force added by the operator said motion occurs.

5. A collapsible spindle comprising, in combination, a shaft and work holding members, movable along said shaft in tapered grooves on its surface between expanded and contracted positions; and means tending constantly to move them to one of said positions, whereby, upon removal of work, they are automatically re-set.

6. A collapsible spindle, comprising, in combination, a shaft having an axial cavity and work holding members movable along the surface of said shaft between expanded and contracted positions; and a spring pressing them constantly toward their holding position arranged within said cavity and having connection with all said members, to hold them there during the winding and to exert uniform pressure upon them when not over borne by the operator.

7. A collapsible spindle comprising, in combination, a shaft and work holding members on it and distributed around it; roller bearings supporting the work holding members movably on tapering surfaces extending along the shaft, whereby friction opposing their lengthwise motion thereon is avoided; and means to permit and to prevent said motion.

8. A collapsible spindle comprising, in combination, a shaft and work holding members on it and distributed around it; roller bearings supporting the work holding members movably on tapering surfaces on the shaft, whereby friction opposing their lengthwise motion thereon is avoided; a spring opposing such motion from work holding position, exceeding in strength the force with which the members tend to move on said bearings when holding work, and not equaling the frictional drag of the work on the members; whereby a pull of the operator on the work may overcome the spring and move the members to a collapsed position, where their friction against the work is so diminished that the work is released.

9. A collapsible spindle comprising, in combination, a shaft and work holding members thereon extending along the shaft; there being a tapered bearing for each member between it and the axis, comprising a multiplicity of rolling bodies arranged in close proximity together and underlying substantially the whole length of the member; and means to restrain and to permit movement of said members on said bearing.

10. A collapsible spindle having, in combination, movable work holding members and integral control means therefor, tending yieldingly to maintain them uniformly in work holding position; said work holding members being arranged so that the work held thereon tends to collapse them; and said control means being arranged to prevail over the collapsing force except when the control means is opposed by the operator.

11. A collapsible spindle having a shank end which constitutes its sole support and having a free end which is constantly exposed for removal of work; said spindle having work holding members with a substantially frictionless tapered bearing for lengthwise motion of said members extending along the surface of the shaft; and means automatically and continuously tending to maintain them in work holding position, adapted to be overcome by the operator to permit said motion toward the free end for removal of the work.

12. A collaspible spindle comprising, in combination, a shaft, work holding members, thereon and means whereby they are self-centering, means whereby said members tend to collapse, and thereby to release the work, when the work is on them; and restraining means acting endwise on said members to hold them uniformly in their self-centered positions preventing such collapse until the restraint is removed by the operator.

13. A collapsible spindle comprising, in combination, a shaft; work holding members thereon; means whereby said members tend to collapse, and thereby to release the work when the work constricts them; and removable restraining means adapted to engage the ends of said members and exert uniform pressure thereon, thereby preventing such collapse; the parts being arranged for the holders on said collapsing movement to be actuated by a resolved component of the force with which the work constricts said holders.

14. A collapsible spindle comprising, in combination, a shaft; roller-bearings extending lengthwise thereon on a taper; bars, which on their inner faces ride on said bearings and on their outer faces are adapted to engage the work; means engaging said bars on their sides and ends, to hold said bars associated with the shaft and distributed around it while permitting them to move on said bearings and in and out from the axis; and controlling means acting in the direction of the axis for restraining said movement.

15. A collapsible spindle comprising, in combination, a shaft, tapered bearings extending lengthwise thereon provided with means for reduction of friction, work holding bars thereon; and means loosely engaging said bars on sides and ends and encircling their ends, whereby their positions relative to each other are maintained unchanged when moved on said bearings and at the end of the shaft, controlling means for restraining or permitting said movement, comprising a washer pressing said engaging means yieldingly toward work holding position.

16. A collapsible spindle comprising, in combination, a shaft, tapered bearings extending lengthwise thereon provided with means for reduction of friction, work holding bars thereon; and means loosely engaging said bars on sides and ends and encircling their ends, whereby their positions relative to each other are maintained unchanged when moved on said bearings and, axially within the shaft, a rod and spring and connections arranged to press said engaging means yieldingly toward work holding position.

17. A collapsible spindle comprising, in combination, a shaft, tapered bearings extending lengthwise thereon provided with means for reduction of friction, work holding bars thereon; and means loosely engaging said bars on sides and ends and encircling their ends, whereby their positions relative to each other are maintained unchanged when moved on said bearings and, axially within the shaft, a rod and spring and connections arranged to press said engaging means yieldingly toward work holding position; said rod having bearings within the shaft at approximately the positions of the ends of the said engaging means and having a head outside of the shaft's end, spreading radially to overlie the ends of and so to control the work holding bars.

18. A collapsible spindle adapted for winding twine comprising, in combination, a shaft adapted at one end to be rotated and at the other end for removal of the work that has been wound thereon, work holding members mounted on tapered bearings on the shaft, collapsing as they move toward said removal end; an axial spring and means connecting it with said members to press them toward work holding position; there being a cleft between parts in the line of pressure of said spring, in which cleft the end of the twine that is to be wound may be inserted and frictionally held by pressure of said spring.

19. A collapsible spindle adapted for winding twine, comprising a shaft adapted at one end to be rotated and adapted at the other end for removal of the work wound thereon; roller strips constituting taper bearings distributed around the shaft; a cage surrounding said strips and shaft; work holding bars passing through the cage inward, to rest on said roller strips and outward to engage the work; and centrally mounted means releasably pressing said bars along said roller bearing to work holding position.

20. A collapsible spindle comprising, in combination, a shaft and work holding members on it and distributed around it; there being a substantially frictionless tapered bearing nearly parallel to the axis of the shaft for lengthwise motion of said members on the shaft; and means to prevent and to permit said motion.

Signed at Plymouth, Massachusetts, this thirteenth day of October, 1921.

JOHN H. DAMON.